United States Patent
Yoshida et al.

(10) Patent No.: US 10,027,196 B2
(45) Date of Patent: Jul. 17, 2018

(54) ELECTRIC TOOL

(71) Applicant: HITACHI KOKI CO., LTD., Tokyo (JP)

(72) Inventors: Kenichirou Yoshida, Ibaraki (JP); Shinji Kuragano, Ibaraki (JP)

(73) Assignee: HITACHI KOKI CO., LTD., Tokyo (JP)

(*) Notice: Subject to any disclaimer, the term of this patent is extended or adjusted under 35 U.S.C. 154(b) by 608 days.

(21) Appl. No.: 14/622,854

(22) Filed: Feb. 14, 2015

(65) Prior Publication Data
US 2015/0244226 A1 Aug. 27, 2015

(30) Foreign Application Priority Data

Feb. 27, 2014 (JP) ................. 2014-037384

(51) Int. Cl.
H02K 3/28 (2006.01)
H02K 7/14 (2006.01)

(52) U.S. Cl.
CPC .............. H02K 3/28 (2013.01); H02K 7/145 (2013.01)

(58) Field of Classification Search
CPC ................. H02K 3/28; H02K 7/145
See application file for complete search history.

(56) References Cited

U.S. PATENT DOCUMENTS

| 4,954,734 | A | 9/1990 | Iguchi et al. |
| 5,619,085 | A | 4/1997 | Shramo |
| 6,930,418 | B2 * | 8/2005 | Kobayashi ............. H02K 3/522 |
| | | | 310/214 |
| 8,912,705 | B2 * | 12/2014 | Lang ..................... H02K 3/30 |
| | | | 310/260 |
| 2006/0138883 | A1 * | 6/2006 | Yagai ..................... H02K 3/522 |
| | | | 310/71 |
| 2011/0068647 | A1 * | 3/2011 | Sakaue ..................... H02K 3/28 |
| | | | 310/71 |
| 2012/0319508 | A1 | 12/2012 | Oomori |
| 2013/0342041 | A1 | 12/2013 | Ayers et al. |

FOREIGN PATENT DOCUMENTS

| DE | 199 19 684 A1 | 11/2000 |
| EP | 2 674 256 A2 | 12/2013 |
| JP | 63-294242 A | 11/1988 |
| JP | 2000-232745 A | 8/2000 |
| JP | 2012-228136 A | 11/2012 |
| JP | 2013-00831 A | 1/2013 |
| JP | 2013-236432 A | 11/2013 |
| WO | 2013/081191 A3 | 6/2013 |
| WO | 2013/122108 A1 | 8/2013 |

OTHER PUBLICATIONS

The extended European Search Report for the related European Patent Application No. 15154780.9 dated Feb. 12, 2016.
Japanese Office Action for the related Japanese Patent Application No. 2014-037384 dated May 10, 2017.

* cited by examiner

Primary Examiner — Dang Le
(74) Attorney, Agent, or Firm — Kenealy Vaidya LLP

(57) ABSTRACT

An electric tool includes a brushless motor having a plurality of phases, the brushless motor. The brushless motor includes a plurality of stator coils connected in parallel with each of the plurality of phases, and a plurality of crossover wires, each of the crossover wires being configured to electrically connect the plurality of stator coils for each of the plurality of phases to each other. The plurality of crossover wires for the plurality of phases are electrically connected to each other.

13 Claims, 14 Drawing Sheets

COMPARATIVE EXAMPLE

COMPARATIVE EXAMPLE

ELECTRIC TOOL

BACKGROUND

The present invention relates to an electric tool configured to use a brushless motor as a driving source.

In recent years, a brushless motor has been adopted in an electric tool configured to rotate a tip tool such as a drill and a driver by a motor, thereby performing a predetermined operation. The brushless motor has, in general, Y connected (star connected) or Δ-connected three-phase windings. The three-phase windings are energized by an inverter. The inverter has switching elements connected to a plus-side and a minus-side of each phase winding (stator coil), i.e., a total of six switching elements, and is configured to sequentially energize the predetermined stator coils. By a magnetic field generated by the stator coils, a rotor having a magnet is rotated. The respective switching elements configuring the inverter are arranged on a switching substrate in the vicinity of the brushless motor.

[Patent Document 1]
Japanese Patent Application Publication No. 2013-831A

When the brushless motor is a three-phase motor and the stator has six poles, for example, two stator coils are provided for each phase. In the brushless motor of the electric tool of the related art, since the stator coils of each phase are connected in series, a resistance (copper loss) of the stator coils with respect to a power supply voltage is large, which is unfavorable for a high output. When a line diameter of the stator coil is increased, it is possible to reduce the resistance. However, a width of a winding slot is limited, so that there is a limitation on the increase in the line diameter.

SUMMARY

It is therefore an object of the present invention to provide an electric motor having a brushless motor capable of increasing an output, as compared to the related art.

An aspect of the present disclosure provides the following arrangements:

An electric tool comprising:
a brushless motor having a plurality of phases, the brushless motor including:
  a plurality of stator coils connected in parallel with each of the plurality of phases, and
  a plurality of crossover wires, each of the crossover wires being configured to electrically connect the plurality of stator coils for each of the plurality of phases to each other,
wherein the plurality of crossover wires for the plurality of phases are electrically connected to each other.

An electric tool comprising:
a brushless motor having a plurality of phases, the brushless motor including:
  a plurality of stator coils connected in parallel with each of the plurality of phases,
  a plurality of crossover wires, each of the crossover wires being configured to electrically connect the plurality of stator coils for each of the plurality of phases to each other,
wherein an opposite end portion of each of the stator coils to the crossover wire is drawn out by a lead wire part, and
wherein the crossover wires for the plurality of phases or the crossover wire for one of the plurality of phases and the lead wire parts of the other phases extend around a rotary shaft of the brushless motor at one axial end-side of the brushless motor, are bound by a conductive wire material and are electrically connected to each other.

An electric tool comprising:
a brushless motor, and
a secondary battery that is a driving source of the brushless motor,
wherein the brushless motor has a plurality of phases and includes a plurality of stator coils connected in parallel with each of the plurality of phases.

In the meantime, any combination of the above-described constitutional elements and a conversion of the expression of the present invention into a method, a system and the like are also effective as aspects of the present invention.

According to the present invention, it is possible to provide the electric motor having the brushless motor capable of increasing an output, as compared to the related art.

DESCRIPTION OF ILLUSTRATIVE EMBODIMENTS

Figure 1:
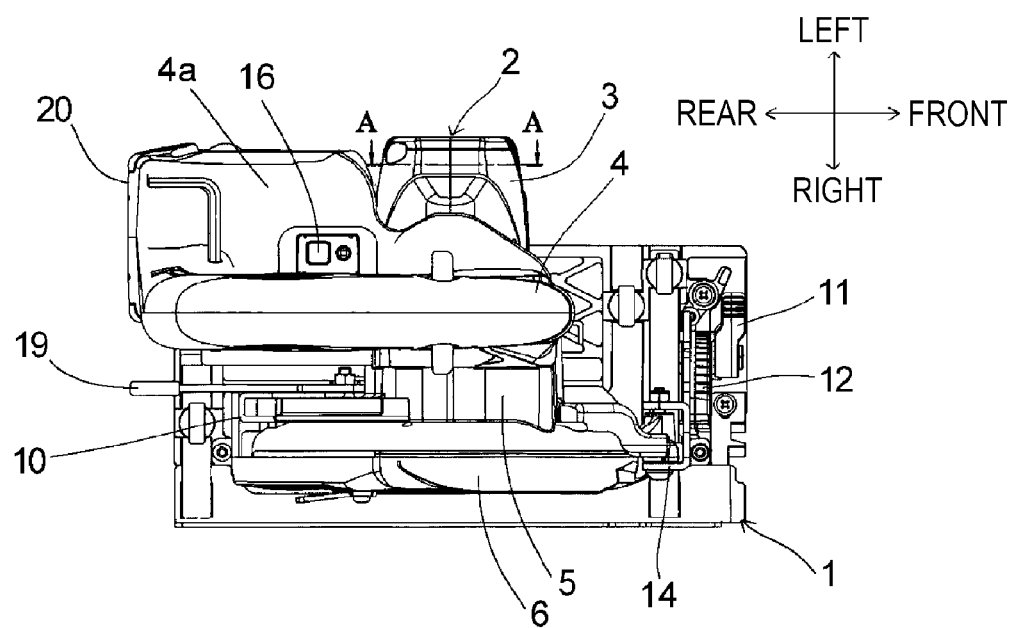
FIG. 1 is a plan view of a cordless round saw according to a first illustrative embodiment of the present invention.

Hereinafter, embodiments of the present invention will be described with reference to the accompanying drawings. Components, members, and the like shown in the drawings and identical or equivalent to each other are denoted by the same reference symbol and may not be repeatedly described. The embodiments do not limit the invention and are illustrative, and all features to be described in the embodiments, and combinations thereof may not be the essential features of the invention.

Figure 5:
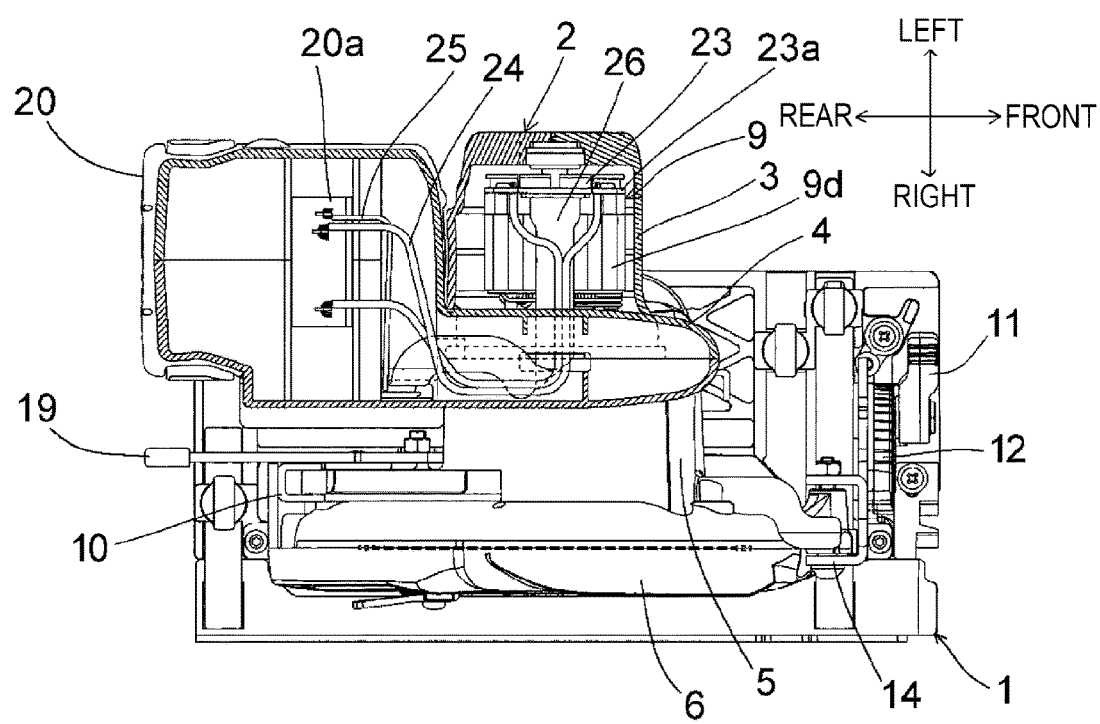
FIG. 5 is a first plan view of the cordless round saw, in which a part is shown in a sectional shape.
Figure 6:
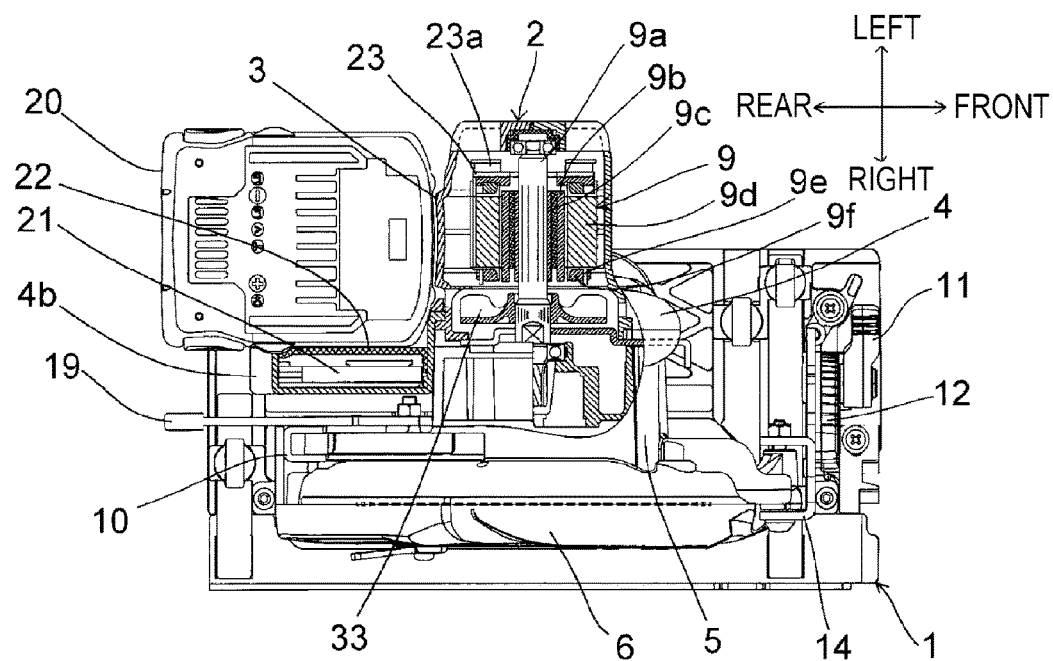
FIG. 6 is a second plan view.
Figure 7:
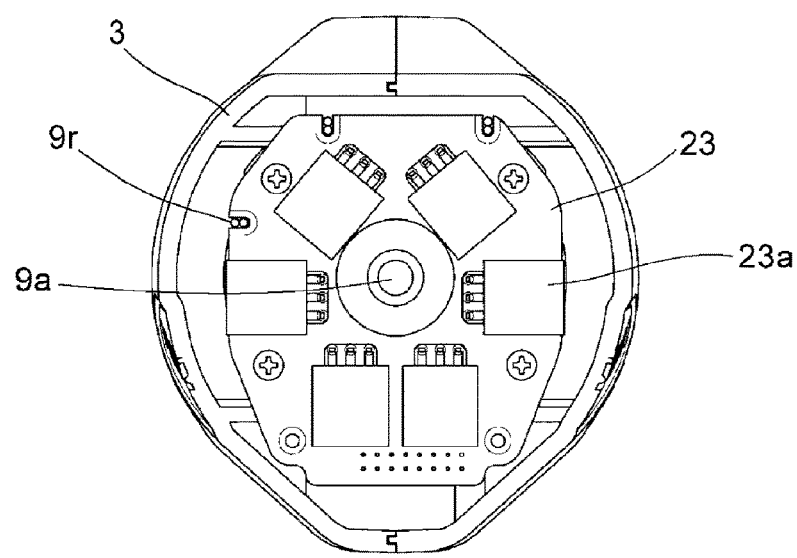
FIG. 7 is a sectional view taken along a line A-A of FIG. 1.

FIGS. 1 to 4 are a plan view, a side view, a rear view, and a front view showing a cordless circular saw according to an embodiment of the present invention, respectively. FIG. 5 is a first plan view of the cordless circular saw where a portion thereof is shown as a cross-section. FIG. 6 is a second plan view of the cordless circular saw where another portion thereof is shown as a cross-section. FIG. 7 is a cross-sectional view taken along a line A-A of FIG. 1.

Figure 2:
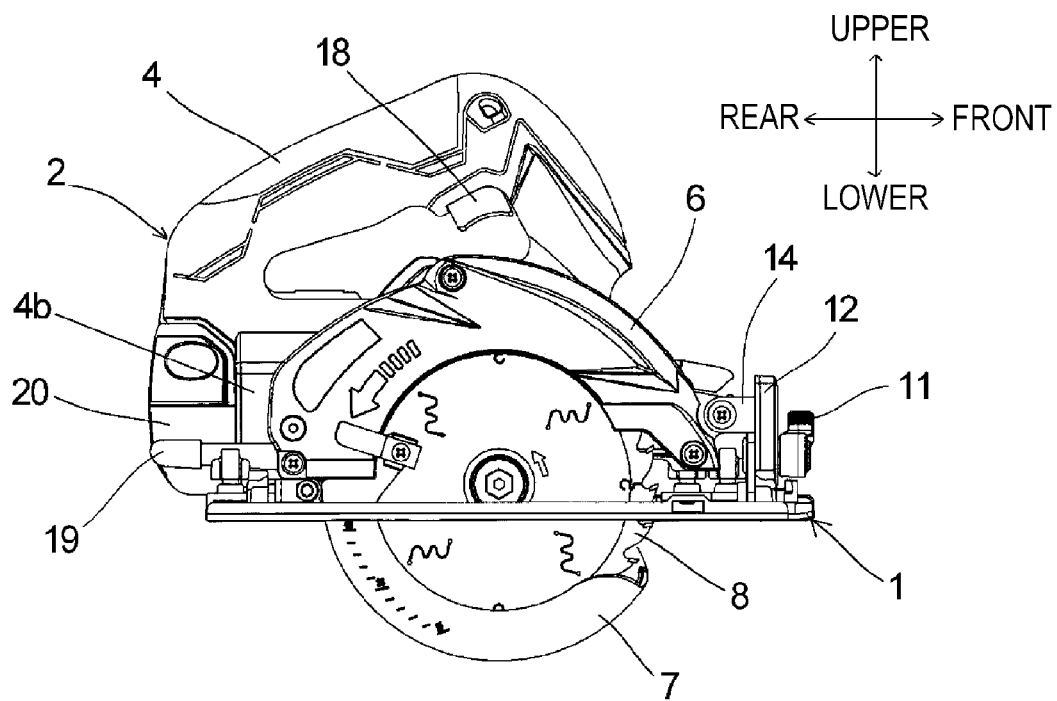
FIG. 2 is a side view of FIG. 1.
Figure 3:
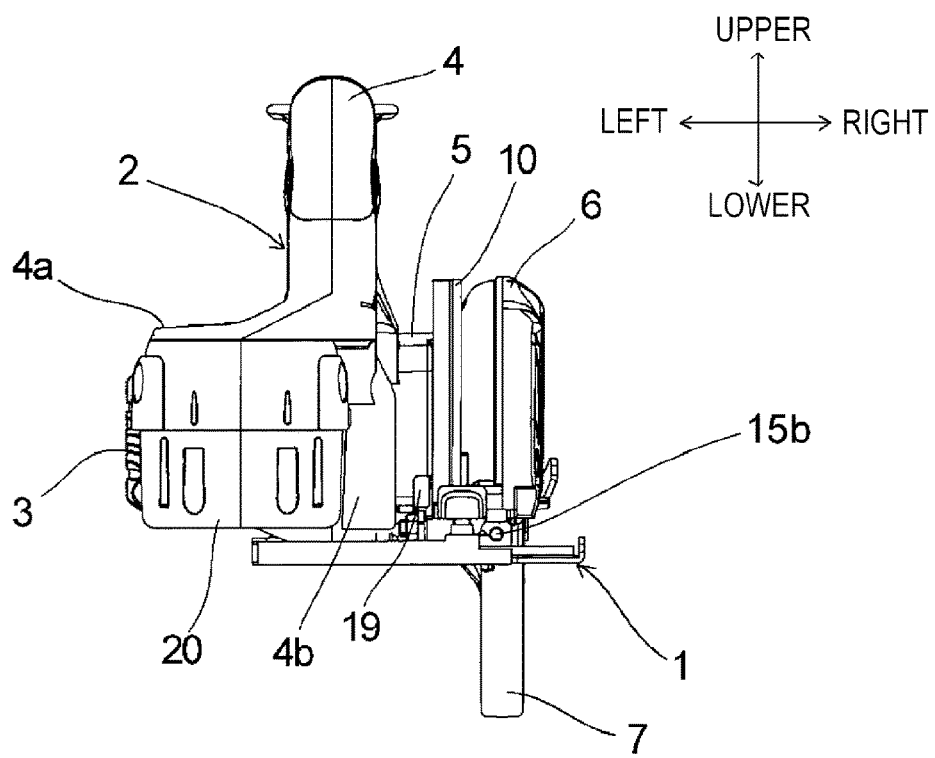
FIG. 3 is a rear view of FIG. 1.
Figure 4:
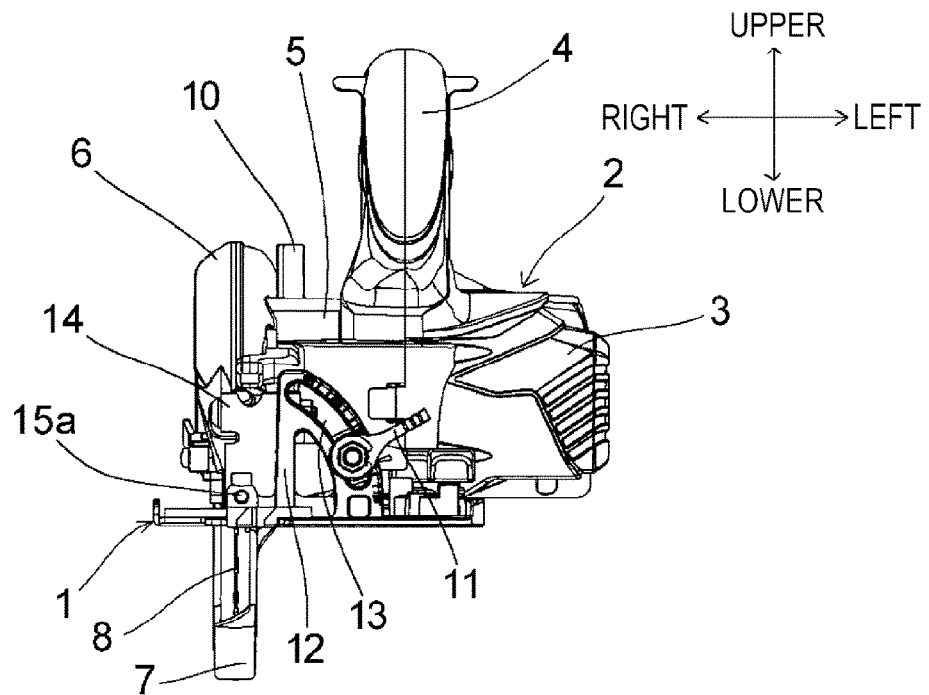
FIG. 4 is a front view of FIG. 1.

The cordless circular saw of the present embodiment includes a base 1 and a main body 2. The base 1 is a plate material made of a metal such as aluminum substantially in a rectangular shape. The longitudinal direction of the base 1 coincides with a cutting direction. The bottom of the base member 101 is a surface to slide on a workpiece. The main body 2 is joined with the base 1 at two positions in a front-rear direction such that the main body can rotate and tilt leftward or rightward with respect to the base 1. The main body 2 includes a motor housing 3, a handle portion 4, a gear cover 5, a saw cover 6, a protective cover 7, and a circular saw blade 8. The motor housing 3 is made of, for example, a resin, and accommodates a brushless motor 9 (FIGS. 5 and 6). The brushless motor 9 rotates the circular saw blade 8. The handle portion 4 is made of the same material as that of the motor housing 3 and is integrally formed with the motor housing 3, and extends in the front-rear direction on the motor housing 3. The handle portion 4 includes a switch 18 for allowing a user to control the driving of the brushless-motor. As shown in FIG. 2, the handle portion 4 is configured by a left component provided integrally with the motor housing 3, and a right component interposed between the motor housing 3 and the gear cover 5, and the left component and the right component are combined to configure a battery pack attaching portion 4a (to be described below), and a control circuit board accommodating portion 4b (to be described below) is provided at the right component of the handle portion 4 positioned on a side of the circular saw blade 8. The boundary between the left component and the right component of the handle portion 4 is a line shown at the center of the handle portion 4 in FIG. 1, FIG. 3, FIG. 4, and so on.

At the lower portion of the rear end of the handle portion 4, the battery pack attaching portion 4a (a battery attaching portion) and the control circuit board accommodating portion 4b are integrally provided. A battery pack 20 (a rechargeable battery) is slid into the battery pack attaching portion 4a from the rear side, thereby being removably attached. A tact switch 16 is disposed on an upper surface of the battery pack attaching portion 4a. The battery pack 20 supplies driving power to the brushless motor 9. As shown in FIG. 1, the left surface of the battery pack 20 attached to the battery pack attaching portion 4a, and the left surface of the motor housing 3 exist substantially on the same plane. That is, the distance of the left surface of the motor housing 3 from the circular saw blade 8, and the distance of the left surface of the battery pack 20 from the circular saw blade 8 are substantially the same. Therefore, it is possible to place the cordless circular saw with the left surface of the battery pack 20 and the left surface of the motor housing 3 downward, and to easily perform work for exchanging the circular saw blade 8. The control circuit board accommodating portion 4b is provided on the right side of the battery pack 20. In the control circuit board accommodating portion 4b, a control circuit board 21 is stored and held. The control circuit board 21 has a control unit (a controller) mounted thereon for controlling the operation of the brushless motor 9. The control circuit board 21 is substantially perpendicular to the rotation axis of the brushless motor 9 (the rotation axis of the circular saw blade 8). The control circuit board 21, more specifically, the left side of the control circuit board 21 is partitioned off from the battery pack 20 by a controller cover 22 made of, for example, a resin.

The gear cover 5 is provided on the right side of the handle portion 4. The gear cover 5 is made of, for example, a metal, and accommodates a mechanism for transmitting rotation between the brushless motor 9 and the circular saw blade 8. The rotation transmitting mechanism is configured by a known deceleration mechanism. The saw cover 6 is attached to the gear cover 5, and covers the upper half of the circular saw blade 8 in conjunction with the gear cover 5. The saw cover 6 may be formed of the same material as that of the gear cover 5, integrally with the gear cover 5. The front end portions of the gear cover 5 and the saw cover 6 are rotatably joined by a rotation supporting unit 14. The protective cover 7 is made of, for example, a resin, and is rotatably provided along the outer edges of the gear cover 5 and the saw cover 6 on the rear side of the gear cover 5. Between the gear cover 5 and the protective cover 7, a spring (not shown) is interposed. This spring biases the protective cover 7 against the gear cover 5, in a direction (a counter-clockwise direction in FIG. 2) for covering the lower half of the circular saw blade 8 in the circumferential direction of the gear cover 5 and the saw cover 6. Therefore, in a state where cutting work is not being performed, the protective cover 7 covers the lower half of the circular saw blade 8 (a portion protruding from the bottom of the base 1), except for a portion of the front side.

On the front side of the base 1, a bevel plate 12 is provided to stand. The bevel plate 12 stands in a short-length direction substantially perpendicular to a cutting direction. The bevel plate 12 has a long hole 13. The long hole 13 has an arc shape having a first tilt shaft portion 15a extending in the cutting direction, as the center, and perpendicular to the first tilt shaft portion 15a. The rotation supporting unit 14 is supported to be able to tilt on the first tilt shaft portion 15a to left or right with respect to the base 1. The tilt position of the rotation supporting unit 14 is adjusted in a state where a tilt-angle adjusting lever 11 is loose, and is fixed by fastening the tilt-angle adjusting lever 11. The rotation supporting unit 14 rotatably supports the front end portion of the saw cover 6 on an axis parallel to the rotation axis of the brushless motor 9 (the rotation axis of the circular saw blade 8). Adjusting and fixing of the rotational position of the saw cover 6 will be described below.

On the rear side of the base 1, a link 10 is provided along the left surface of the gear cover 5 so as to be rotatable around a tilt shaft portion 15b concentric with the first tilt shaft portion 15a. The link 10 is made of a metal such as aluminum. In a state where a cutting-depth adjusting lever 19 is loose, the link 10 and the gear cover 5 are slidable with respect to each other, and thus it is possible to adjust the rotational position of the saw cover 6 with respect to the base 1, that is, the cutting depth. Further, it is possible to fix the rotational position of the gear cover 5 by fastening the cutting-depth adjusting lever 19.

As shown in FIG. 6, the brushless motor 9 has a rotor core 9b around an output shaft 9a. The output shaft 9a is parallel to the rotation axis of the circular saw blade 8. The rotor core 9b rotates integrally with the output shaft 9a. A rotor magnet 9c is inserted into and supported in the rotor core 9b. A stator core 9d is provided to surround the outer circumferential surface of the rotor core 9b. On the stator core 9d, a stator coil 9f is provided with a pair of insulators 9e interposed therebetween. On the end surface of the insulator 9e attached to the stator core 9d, a switching board 23 is fixed. The switching board 23 is substantially perpendicular to the output shaft 9a. As shown in FIG. 7, on the switching board 23, six switching devices 23a (such as FETs) are mounted such that their main body portions are laid down. The switching devices 23a switch a supply voltage from the battery pack 20. As shown in FIG. 5, a terminal portion 20a of the battery pack 20, and the switching board 23 are electrically connected to each other by a wiring line 24. A wiring line 25 electrically connects the terminal portion 20a of the battery pack 20 and the control circuit board 21 to each other. A wiring line 26 electrically connects the control circuit board 21 and the switching board 23 to each other. A control signal from the controller of the control circuit board 21 is applied to control terminals (gates) of the switching devices 23a mounted on the switching board 23, by the wiring line 26, whereby ON/OFF of the switching devices 23a is controlled. A cooling fan 33 is attached to the output shaft 9a of the brushless motor 9, and rotates with the output shaft 9a. The cooling fan 33 generates an air flow which cools the brushless motor 9 and the switching devices 23a.

Figure 8:
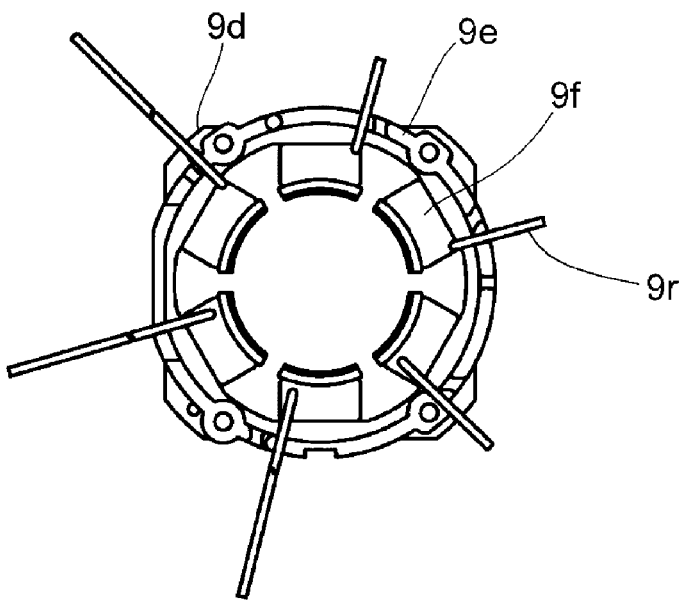
FIG. 8 is a front view of a stator of a brushless motor 9 of the cordless round saw.
Figure 9:
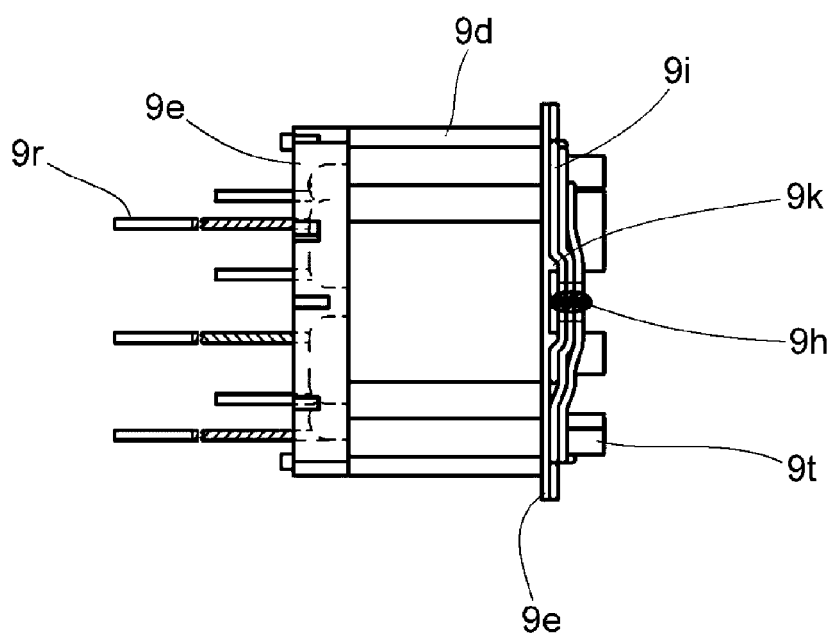
FIG. 9 is a right side view of FIG. 8.
Figure 10:
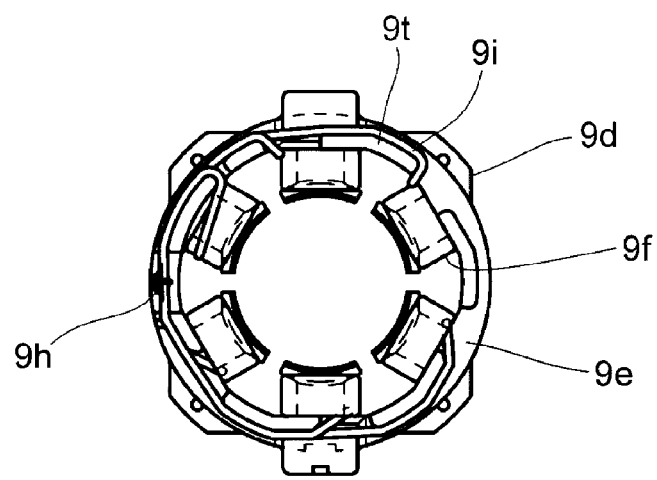
FIG. 10 is a rear view of FIG. 8.
Figure 11:
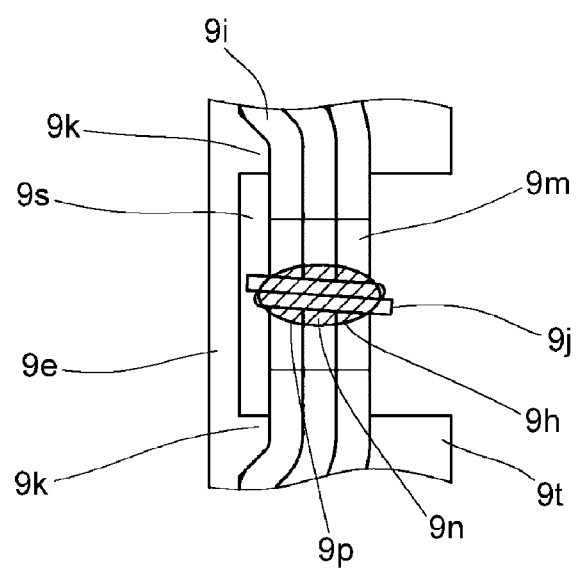
FIG. 11 is an enlarged view of main parts of FIG. 9.
Figure 12:
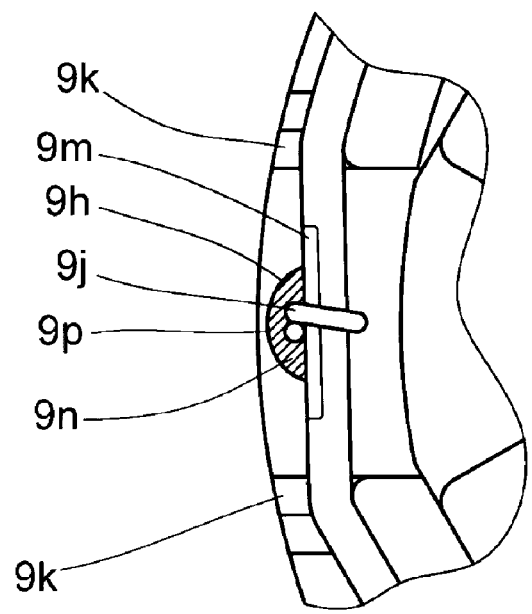
FIG. 12 is an enlarged view of main parts of FIG. 10.
Figure 13:
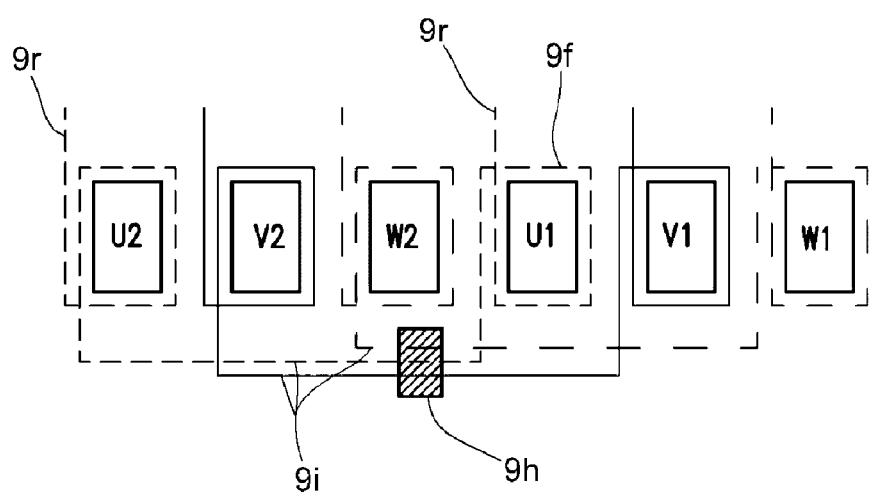
FIG. 13 is a pictorial view of windings of stator coils 9f of each phase of the brushless motor 9.
Figure 14:
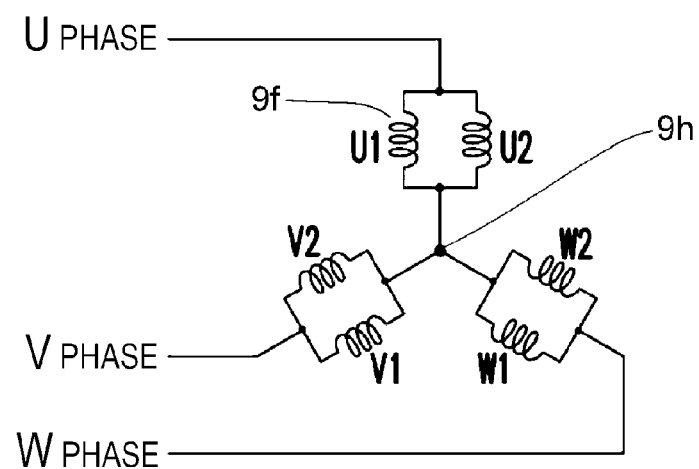
FIG. 14 illustrates a wire connection of FIG. 13.

FIG. 8 is a front view of the stator of the brushless motor 9 shown in FIGS. 5 and 6, FIG. 9 is a right side view of FIG. 8, and FIG. 10 is a rear view of FIG. 8. FIG. 11 is an enlarged view of main parts of FIG. 9. FIG. 12 is an enlarged view of main parts of FIG. 10. FIG. 13 is a pictorial view of windings of stator coils 9f of each phase of the brushless motor 9 (which corresponds to a state showing the developed stator core 9d as seen from an outer periphery-side). FIG. 14 illustrates a wire connection of FIG. 13.

As shown in FIG. 14, the brushless motor 9 has three phases, and stator coils 9f (U1, U2, V1, V2, W1, W2 in FIG. 14) of a U phase, a V phase and a W phase are Y-connected. The two stator coils 9f are provided in parallel for each phase. The stator coils 9f of the respective phases are connected each other at a neutral point 9h.

As shown in FIG. 13, the two stator coils 9f of each phase are the same as regards a winding direction as seen from an outer periphery and are electrically connected to each other by a crossover wire 9i. The crossover wires 9i of all phases are electrically connected to each other at one place, thereby configuring the neutral point 9h. As shown in FIGS. 9 and 10, the insulator 9e is provided on an opposite end surface of the stator core 9d to the switching substrate 23, and the crossover wires 9i of the respective phases extend around the output shaft (rotary shaft) 9a of the brushless motor 9 on an opposite surface of the insulator 9e to the stator core 9d and are electrically connected to each other on the surface of the insulator 9e. On the surface of the insulator 9e, a plurality of guide ribs 9t is provided along the periphery of the output shaft 9a of the brushless motor 9 and is configured to guide the crossover wires 9i of the respective phases.

As shown in the enlarged views of FIGS. 11 and 12, the three crossover wires 9i are arranged so that portions thereof overlap in a direction parallel with the output shaft 9a of the brushless motor 9 (FIG. 11), and are bound by winding a conductive wire material 9j (for example, tin plated wire and the like) several times at the overlapping portions, and the bound portions are fixed by a soldering. In the meantime, the wire material configuring the stator coil 9f is an insulating sheathed wire. However, the respective crossover wires 9i have insulating sheath-removed portions 9m at the portions (the portions contacting the conductive wire material 9j and a soldering 9n) bound by the conductive wire material 9j, so that they can be conducted each other. A surface of the soldering 9n is covered by an insulating material 9p.

As shown in FIGS. 9 and 11, the insulator 9e has a pair of convex parts 9k. The pair of convex parts 9k is configured to raise both sides of the portions of the crossover wires 9i bound by the conductive wire material 9j. Thereby, a gap 9s (FIG. 11) is formed between the crossover wires 9i and the insulator 9e, so that the operability is improved when binding the crossover wires 9i by the conductive wire material 9j. As shown in FIGS. 7 and 9, opposite end portions of the respective stator coils 9f to the crossover wires 9i are drawn out on the switching substrate 23 by lead wire parts 9r and are electrically connected to a conductive pattern on the switching substrate 23.

Figure 15:
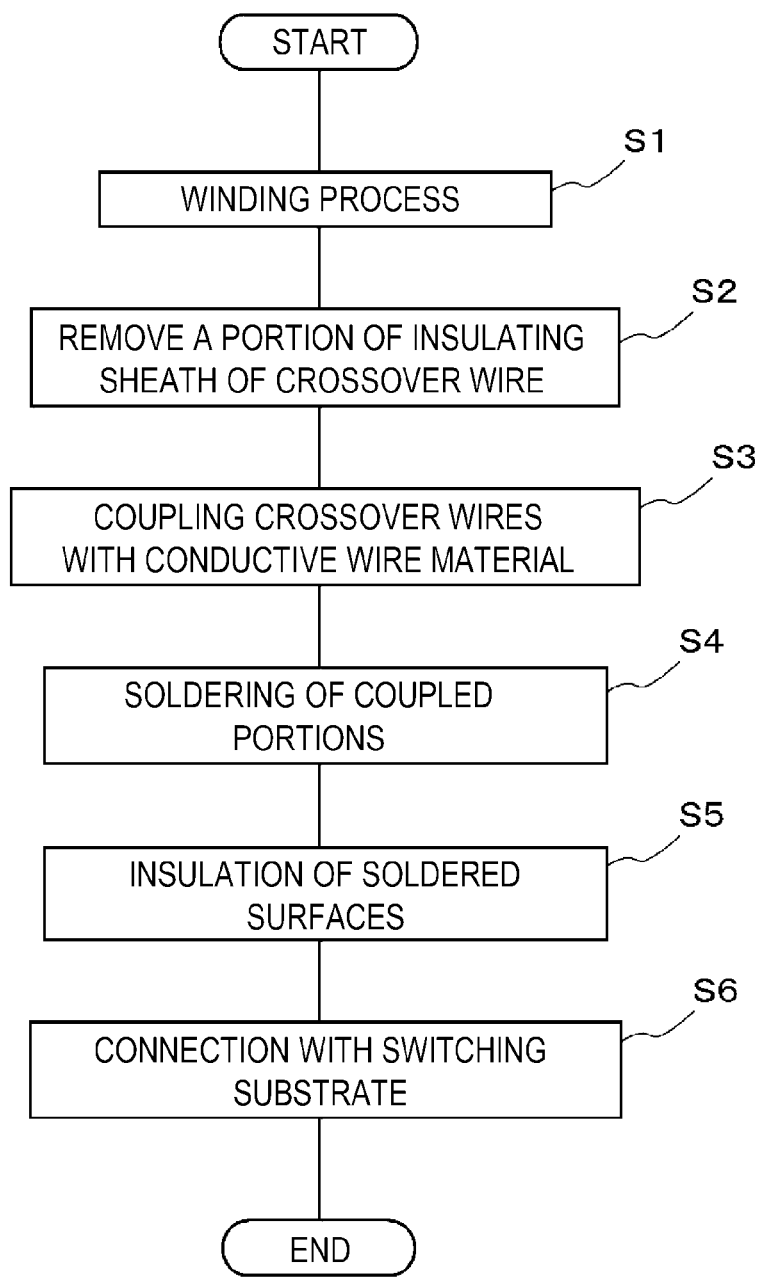
FIG. 15 is a flowchart showing a manufacturing process of the brushless motor 9.

FIG. 15 is a flowchart showing a manufacturing process of the brushless motor 9. First, the insulating sheathed wires are wound in the respective winding slots of the stator core 9d, so that the stator coils 9f of the respective phases are formed (S1). Then, the insulating sheath of a portion of the crossover wire 9i of each phase, which is electrically connected to the crossover wires 9i of the other phases, is removed (S2). Then, the three crossover wires 9i are bound and coupled by the conductive wire material 9j (S3), the coupled portions are further fixed by the soldering (S4) and a surface of the soldering is insulating-sheathed (S5). After that, the lead wire parts 9r of the respective stator coils 9f are electrically connected to the conductive pattern on the switching substrate 23 (S6). In the meantime, the connection of the lead wire parts 9r to the switching substrate 23 may be performed between steps S1 and S2 of FIG. 15.

According to this illustrative embodiment, following effects can be accomplished.

Figure 16:
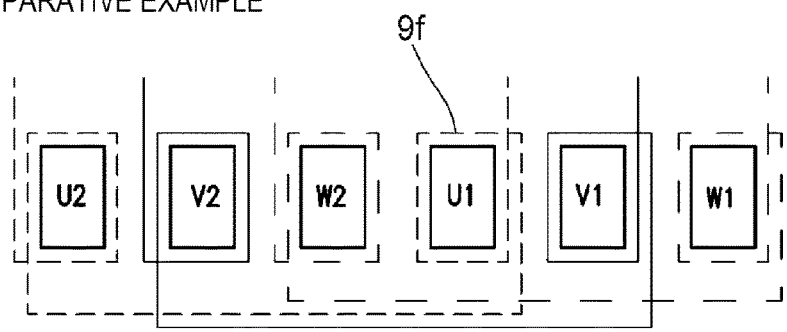
FIG. 16 is a pictorial view of windings of stator coils of each phase of a brushless motor according to a comparative example.
Figure 17:
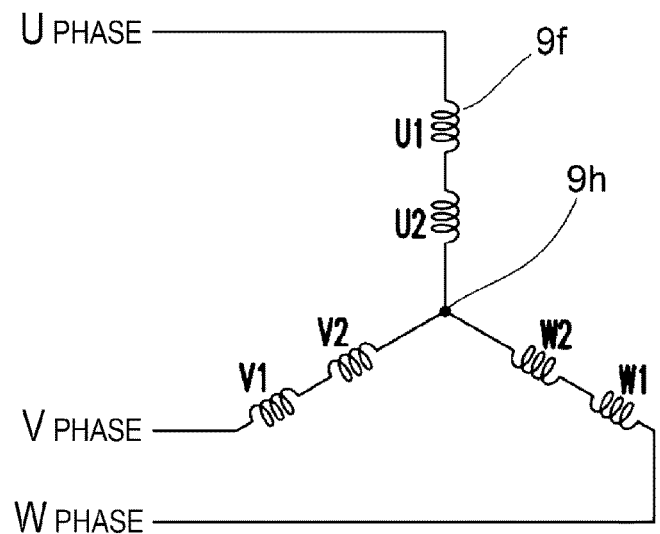
FIG. 17 illustrates a wire connection of FIG. 16.

(1) Since the two stator coils 9f of each phase are connected in parallel, it is possible to reduce a resistance of each phase and to accomplish a high output of the brushless motor 9, as compared to a structure of a comparative example shown in FIGS. 16 and 17 where the two stator coils 9f of each phase are connected in series.

(2) The two stator coils 9f of each phase are electrically connected to each other by the crossover wire 9i and the crossover wires 9i are electrically connected to each other to form the neutral point 9h. Thereby, as compared to a structure where the terminals (six) of the six stator coils 9f are individually drawn out and connected without the crossover wires 9i, it is possible to reduce the number of wire materials to be connected and to thus improve the operability.

(3) The three crossover wires 9i are electrically connected to each other at one place to configure the neutral point 9h, which is advantageous from a standpoint of reducing the number of processes.

(4) The respective crossover wires 9i are encircled around the output shaft 9a of the brushless motor 9 to overlap with each other in the direction parallel with the output shaft 9a on the insulator 9e and the crossover wires 9i are electrically connected to each other at the overlapping portions. Therefore, it is possible to easily perform the process of connecting the crossover wires 9i.

(5) Since the plurality of crossover wires 9i is bound by the conductive wire material 9j, the reliability of the physical fixing and electrical connection of the crossover wires 9i is high. Also, as described above, since the portions raised by the pair of convex parts 9k of the insulator 9e are bound by the conductive wire material 9j, the operability is improved upon the binding.

(6) Since the portions bound by the conductive wire material 9j are soldered, it is possible to further improve the reliability of the physical fixing and electrical connection of the crossover wires 9i. In addition, it is possible to increase a sectional area of a current path of the wire connected part by the soldering 9n, thereby reducing the resistance of the wire connected part, which is advantageous to the high output of the brushless motor 9.

(7) The drawing direction of each stator coil 9f by the lead wire part 9r is opposite to the crossover wire 9i. Therefore, when encircling the crossover wire 9i around the output shaft 9a of the brushless motor 9, the crossover wire 9i does not interfere with the lead wire part 9r, which improves the operability. Also, since it is not necessary to provide the same insulator 9e with a screw seat for fixing of the switching substrate 23 and a rib for guide (the guide rib 9t) of the crossover wire 9i, it is not necessary to increase a diametrical size of the insulator 9e so as to guide the crossover wire 9i. Therefore, the insulator 9e and the crossover wire 9i can be configured not to protrude beyond the stator coil 9d, so that it is possible to make the electric tool small.

(8) Since the surface of the soldering 9n is covered by the insulating material 9p, it is possible to securely insulate the neutral point 9h and the stator core 9d.

Second Illustrative Embodiment

Figure 18:
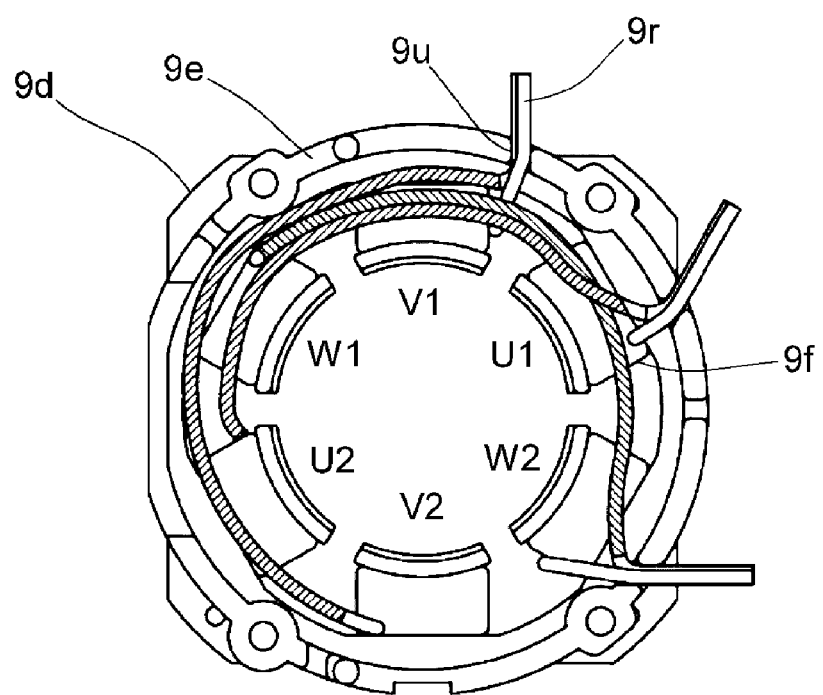
FIG. 18 is a front view of a stator of a brushless motor of a cordless round saw according to a second illustrative embodiment of the present invention.

FIG. 18 is a front view of a stator of a brushless motor of a cordless round saw according to a second illustrative embodiment of the present invention. In the second illustrative embodiment, for example, the lead wire part 9r of the stator coil 9f of the U1 phase is drawn out to the outer periphery-side through a recess portion 9u, as it is, and the lead wire part 9r of the stator coil 9f of the U2 phase is extended with being insulating-sheathed towards the U1 phase and is then drawn out to the outer periphery-side through the recess portion 9u together with the lead wire part 9r of the stator coil 9f of the U1 phase. According to this configuration, it is possible to connect the U1 phase and the U2 phase to the switching substrate 23 at one place, which is advantageous from the standpoint of reducing the number of processes. This is also the same for the V phase and the W phase. The others of the second illustrative embodiment are the same as the first illustrative embodiment, and the same effects can be accomplished.

Third Illustrative Embodiment

Figure 19:
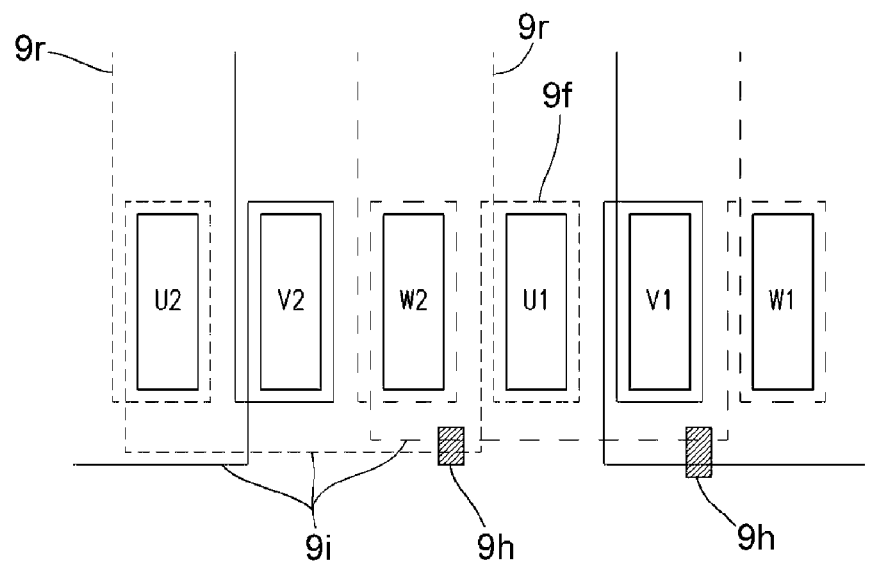
FIG. 19 is a pictorial view of windings of stator coils 9f of each phase of a brushless motor of a cordless round saw according to a third illustrative embodiment of the present invention.
Figure 20:
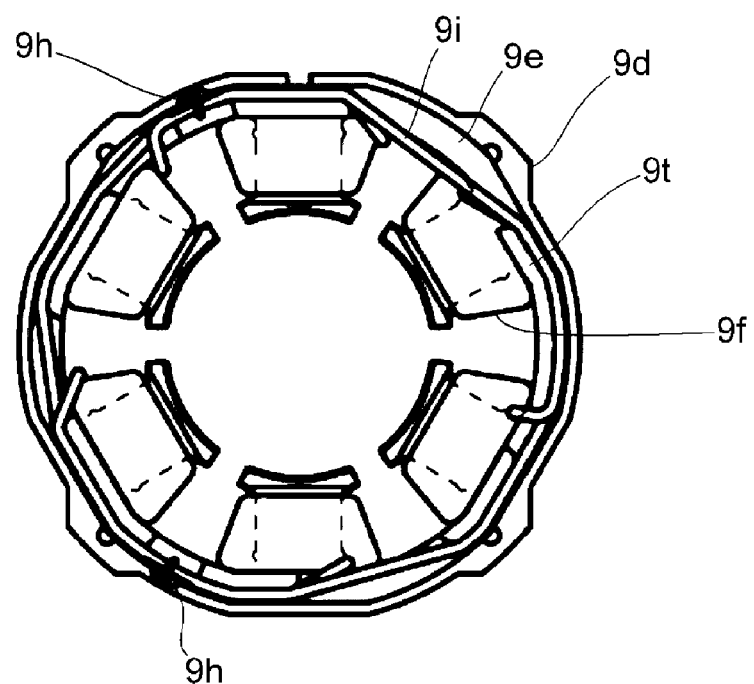
FIG. 20 is a rear view of a stator of the brushless motor.

FIG. 19 is a pictorial view of windings of the stator coils 9f of each phase of a brushless motor of a cordless round saw according to a third illustrative embodiment of the present invention. FIG. 20 is a rear view of a stator of the brushless motor. In the third illustrative embodiment, the crossover wire 9i of the U phase and the crossover wire 9i of the W phase are electrically connected to each other at one place, and the crossover wire 9i of the V phase and the crossover wire 9i of the W phase are electrically connected to each other at one separate place. According to this configuration, although the connection places of the crossover wires 9i are increased to increase the number of processes, it is possible to reduce the number of the crossover wires 9i overlapping in the direction parallel with the output shaft 9a of the brushless motor 9 by two, which is advantageous when it is intended to shorten an axial size of the brushless motor 9. The others of the third illustrative embodiment are the same as the first illustrative embodiment, and the same effects can be accomplished.

Fourth Illustrative Embodiment

Figure 21:
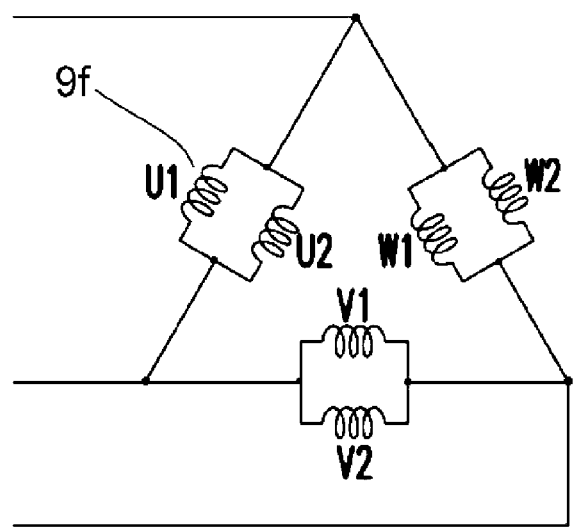
FIG. 21 illustrates a wire connection of stator coils 9f of each phase of a brushless motor of a cordless round saw according to a fourth illustrative embodiment of the present invention.
Figure 22:
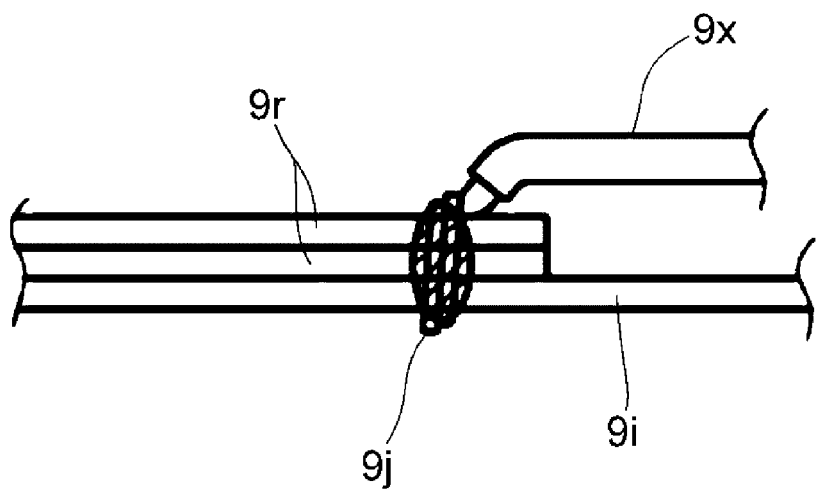
FIG. 22 is an enlarged view of a wire connected part of the stator coils 9f of the fourth illustrative embodiment.

FIG. 21 illustrates a wire connection of the stator coils 9f of the respective phase of a brushless motor of a cordless round saw according to a fourth illustrative embodiment of the present invention. FIG. 22 is an enlarged view of a wire connected part of the stator coils 9f of the fourth illustrative embodiment. In the fourth illustrative embodiment, as shown in FIG. 21, the stator coils 9f (U1, U2, V1, V2, W1, W2 in FIG. 21) of the U phase, the V phase and the W phase are Δ-connected. For this reason, instead of electrically connecting the crossover wires 9i, like the first illustrative embodiment, the lead wire parts 9r of the two stator coils 9f of any phase and the crossover wires 9i of the stator coils 9f of the other phases are encircled around the rotary shaft of the brushless motor on the plane of the insulator, as shown in FIG. 22, like the first illustrative embodiment, and are electrically connected to each other together with a lead wire 9x connected to the switching substrate 23. In this illustrative embodiment, the connection can be performed by both the binding using the conductive wire material 9j and the soldering, like the first illustrative embodiment. The wire connected part shown in FIG. 22 is provided at three places. The others of the third illustrative embodiment are the same as the first illustrative embodiment, and the same effects can be accomplished.

Although the present invention has been described with reference to the illustrative embodiments, one skilled in the art can understand that the respective constitutional elements and respective processes of the illustrative embodiments can be variously modified. In the below, the modified embodiments are described.

The stator coils 9f of each phase may be three or more. The fixing of the wire connected part may be made by the binding using the conductive wire material 9j or the soldering, or may be made by the other electrical connection methods. The electric tool to which the present invention is applied is not limited to the cordless round saw and may be an electric tool (a drill driver and the like) having a tip tool such as a drill and a driver attached thereto, an electric tool (a dust collector or air compressor) having no tip tool, and the like.

What is claimed is:

1. An electric tool comprising:
   a brushless motor having a plurality of phases, the brushless motor including:
      a plurality of stator coils connected in parallel with each of the plurality of phases, and
      a plurality of crossover wires, each of the crossover wires being configured to electrically connect the plurality of stator coils for each of the plurality of phases to each other,
      wherein a crossover wire of each of the plurality of phases extends around a rotary shaft of the brushless motor at one axial end-side of the brushless motor, and at least portions of the crossover wires overlap in a direction of the rotary shaft of the brushless motor
      wherein the crossover wires which are overlapped have insulating sheath-removed portions
      wherein the plurality of crossover wires for the plurality of phases are electrically connected to each other at the insulating sheath-removed portions.

2. The electric tool according to claim 1, wherein the crossover wires of all the plurality of phases are electrically connected to each other at one place.

3. The electric tool according to claim 1, wherein the crossover wires of the plurality of phases belonging to any combination of two of the plurality of phases are electrically connected to each other at a position different from a place where the crossover wires of the plurality of phases belonging to another combination of two of the plurality of phases are electrically connected to each other, and the crossover wires of all phases are electrically connected to each other.

4. The electric tool according to claim 1, wherein the crossover wires of the plurality of phases are bound by a conductive wire material.

5. The electric tool according to claim 4, wherein portions of the crossover wires of the plurality of phases bound by the conductive wire material are soldered.

6. The electric tool according to claim 5, wherein surfaces of the soldered portion are covered with an insulating material.

7. The electric tool according to claim 1, wherein an insulator is provided on one end surface of a stator core of the brushless motor, the crossover wires of the respective phases extend around a rotary shaft of the brushless motor on an opposite surface of the insulator to the stator core and are electrically connected to each other on the surface of the insulator.

8. The electric tool according to claim 7, wherein the insulator has a convex part configured to raise both sides of portions of the crossover wires of the plurality of phases bound by the conductive wire material.

9. The electric tool according to claim 1, wherein an opposite end portion of each stator coil to the crossover wire is drawn out towards one axial side of the brushless motor by a lead wire part and the crossover wire exists at the other axial side.

10. The electric tool according to claim 9, wherein the one axial side of the brushless motor is provided with a switching substrate to which the lead wire part is electrically connected.

11. The electric tool according to claim 1, wherein the brushless motor is a three-phase brushless motor and the stator coils thereof are Y-connected.

12. An electric tool comprising:
a brushless motor having a plurality of phases, the brushless motor including:
a plurality of stator coils connected in parallel with each of the plurality of phases,
a plurality of crossover wires, each of the crossover wires being configured to electrically connect the plurality of stator coils for each of the plurality of phases to each other, wherein an opposite end portion of each of the stator coils to the crossover wire is drawn out by a lead wire part, and
wherein the crossover wires for the plurality of phases or the crossover wire for one of the plurality of phases and the lead wire parts of the other phases extend around a rotary shaft of the brushless motor at one axial end-side of the brushless motor, are bound by a conductive wire material and are electrically connected to each other.

13. The electric tool according to claim 12, wherein an insulator is provided on one end surface of a stator core of the brushless motor, the crossover wires of the respective phases and the lead wire parts are electrically connected to each other on an opposite surface of the insulator to the stator core.

* * * * *